US006917837B2

(12) United States Patent
Hashimoto et al.

(10) Patent No.: US 6,917,837 B2
(45) Date of Patent: Jul. 12, 2005

(54) CONTROLLER HAVING AN IMPACT SENSOR

(75) Inventors: Yoshiki Hashimoto, Hadano (JP); Nobuo Chino, Yamanashi (JP)

(73) Assignee: Fanuc LTD, Yamanashi (JP)

( * ) Notice: Subject to any disclaimer, the term of this patent is extended or adjusted under 35 U.S.C. 154(b) by 164 days.

(21) Appl. No.: 10/368,384

(22) Filed: Feb. 20, 2003

(65) Prior Publication Data

US 2003/0187524 A1 Oct. 2, 2003

(30) Foreign Application Priority Data

Mar. 28, 2002 (JP) ........................................ 2002-091128

(51) Int. Cl.[7] ................................................ G05B 11/01

(52) U.S. Cl. ............................ 700/20; 700/19; 700/21; 700/23; 700/65; 700/66; 700/79; 700/246; 718/100; 718/104; 718/106

(58) Field of Search .............................. 700/15, 65–66, 700/19, 20, 21, 23, 79–82, 245, 246, 250, 168; 718/1, 100, 104, 106

(56) References Cited

U.S. PATENT DOCUMENTS 6,522,347 B1 * 2/2003 Tsuji et al. ................. 345/848
6,597,142 B2 * 7/2003 Shibukawa et al. .......... 318/569
2002/0036796 A1 * 3/2002 Kurozasa et al. .......... 358/1.15
2002/0065070 A1 * 5/2002 Naiki ......................... 455/419
2003/0007777 A1 * 1/2003 Okajima et al. .............. 386/46

FOREIGN PATENT DOCUMENTS

| | | | | |
|---|---|---|---|---|
| EP | 1349429 A2 | * | 10/2003 | ............ H05B/3/14 |
| JP | 03234198 A | * | 10/1991 | ............ H04Q/9/00 |
| JP | 5-55204 | | 7/1993 | |
| JP | 05-241604 | | 9/1993 | |
| JP | 06-035521 | | 2/1994 | |
| JP | 08-043425 | | 2/1996 | |

* cited by examiner

*Primary Examiner*—Ramesh Patel
(74) *Attorney, Agent, or Firm*—Staas & Halsey LLP

(57) ABSTRACT

A portable operation section of a controller has an impact sensor. When the controller receives an impact due to the drop or the like of the portable operation section, the impact sensor outputs an impact detection signal to the control section. Upon receiving this impact detection signal, the control section ignores any signal from the portable operation section and thus does not use this signal for the control of the drive of the mechanism section of a machine tool or a robot.

12 Claims, 7 Drawing Sheets

CONTROLLER HAVING AN IMPACT SENSOR

BACKGROUND OF THE INVENTION

1. Field of the Invention

This invention relates to a portable operation device provided for a controller that controls a machine tool or a robot.

2. Description of the Prior Art

Some of controllers for machine tools have a portable operation panel which may be carried by a user. Robot controllers also generally have portable operation sections, such as teaching pendant, which may be carried by the user. Such portable operation sections have a display section using liquid crystal or the like and an input operation section such as various keys and switches and have therein precision circuits.

Conventional portable operation sections have been recognized as a part of a controller or an extension of a controller, so that they have been considered that they may be subjected to no impact from outside, though they are portable, similarly to the case of controllers.

A portable operation section is generally operated by an operator who holds it by the hands. Accordingly, there may be a case where an operator who operates a portable operation section drops it by mistake to give it an impact. However, as the conventional portable device has been designed on the assumption that it will never be subjected to an impact, as described above, it is not equipped with an impact detection device or the like. In consequence, when the conventional portable operation section is dropped by mistake, an operator only visually checks for the appearance thereof and then continues to use it as long as no damage is found from the appearance.

However, when the portable operation section is subjected to an impact by the drop or the like, there may a case where a failure in an internal circuit such as an electric circuit or a mechanism or the like is caused, though the appearance is kept as it is. Such a trouble may not be detected through the check of the appearance, so that a continuous use of the portable operation section having such a trouble would cause an unintended motion by the mechanism section of a machine tool or a robot as an object to be controlled, causing a dangerous situation.

OBJECTS AND SUMMARY OF THE INVENTION

It is an object of the present invention to prevent a mechanism section of a machine tool or a robot to be controlled from performing an unintended operation, even when a portable operation section of a controller receives an impact due to the drop or the like thereof and thus has such a trouble that may not be detected through the check of the appearance thereof.

In order to achieve the above object, the first aspect of the controller according to the present invention relates to a controller comprising a control section and a portable operation section which is connected with the control section through a signal line or a radio communication means, wherein the portable operation section has a sensor for detecting an impact applied to the portable operation section and outputting the detection signal to the control section, and the control section has means for disabling the operation of an object to be controlled by the controller when the control section is informed of the detection of an impact by the sensor.

The control section may further comprise means for automatically practicing a trouble diagnosis on the portable operation section when the control section is informed of the detection of an impact by the sensor.

The control section may further comprise means for causing a display means to display the content of an operation for a trouble diagnosis on the portable operation section when informed of the detection of an impact by the sensor, and trouble determination means for determining whether an input signal corresponding to the operation content displayed is normally inputted and determining that a trouble has occurred when detected that no signal is inputted normally.

The controller further comprises a reset input means for inputting a reset signal to the control section, and the control section may comprise means for releasing the disabled status of the operation of an object to be controlled by the controller when the control section receives a reset input from the reset input means.

The second aspect of the controller according to the present invention relates to a controller comprising a control section and a portable operation section which is connected with the control section through a signal line or a radio communication means, wherein the portable operation section has a sensor for detecting an impact applied to the portable operation section and outputting the detection signal to the control section, and the control section comprises means for ignoring a signal from the portable operation section when the control section is informed of the detection of an impact by the sensor.

The third aspect of the controller according to the present invention relates to a controller comprising a control section and a portable operation section which is connected with the control section through a signal line or a radio communication means, wherein the portable operation section has a sensor for detecting an impact applied to the portable operation section and outputting the detection signal to the control section, and the control section comprises means for ignoring a signal from the portable operation section when the control section is informed of the detection of an impact by the sensor.

The fourth aspect of the controller according to the present invention relates to a controller comprising a control section and a portable operation section which is connected with the control section through a signal line or a radio communication means, wherein the portable operation section has a sensor for detecting an impact applied to the portable operation section and outputting the detection signal to the control section, and the control section comprises means for causing a display means to display the content of an operation for a trouble diagnosis on the portable operation section when informed of the detection of an impact by the sensor, trouble determination means for determining whether an input signal corresponding to the operation content displayed is normally inputted and determining that a trouble has occurred when detected that no signal is inputted normally, and means for ignoring a signal from the portable operation section during the practicing of a trouble diagnosis and after the detection of a trouble with the trouble diagnosis.

In the second to fourth aspect of the present invention, the controller may comprise reset input means for inputting a reset signal to the control section, and the control section may comprise means for canceling an ignorance of the signal from the portable operation section when a reset signal is inputted from the reset input means.

The fifth aspect of the controller according to the present invention relates to a controller comprising a control section and a portable operation section which is connected with the control section through a signal line or a radio communication means, wherein the portable operation section comprises a sensor for detecting an impact applied to the portable operation section and outputting the detection signal to the control section, and means for stopping the delivery of a signal to the control section when an impact is detected with the sensor.

Furthermore, the controller according to the present invention may include following embodiments.

The sensor may detect an impact which is higher than the lowest level of an impact strength which has been set in advance.

The sensor may comprise an impact detection storage means for storing the detected impact and output, as an impact detection, a status in which the detected impact is being stored.

The controller may further comprise means for outputting to the sensor a signal for release of the impact detection stored in the impact detection storage means when a reset signal is inputted from the reset input means.

As the controller according to the present invention has the configurations as described above, though the portable operation section of the controller, carried by an operator, is dropped by mistake and an impact is applied to the portable operation section so that wrong signal is sent to the control section of a robot or a machine tool, this signal is ignored so that it is not used for control of the mechanism section of the robot or the machine tool or used for stop of the mechanism section. Therefore, the mechanism section of the robot or the machine tool is prevented from performing an unintended operation such as an overdrive, thereby securing the safety.

BRIEF DESCRIPTION OF THE DRAWINGS

The foregoing and other objects and features of the invention will become apparent from the following description of preferred embodiments of the invention with reference to the accompanying drawings, in which.

DETAILED DESCRIPTION OF THE PREFERRED EMBODIMENTS

Figure 1:
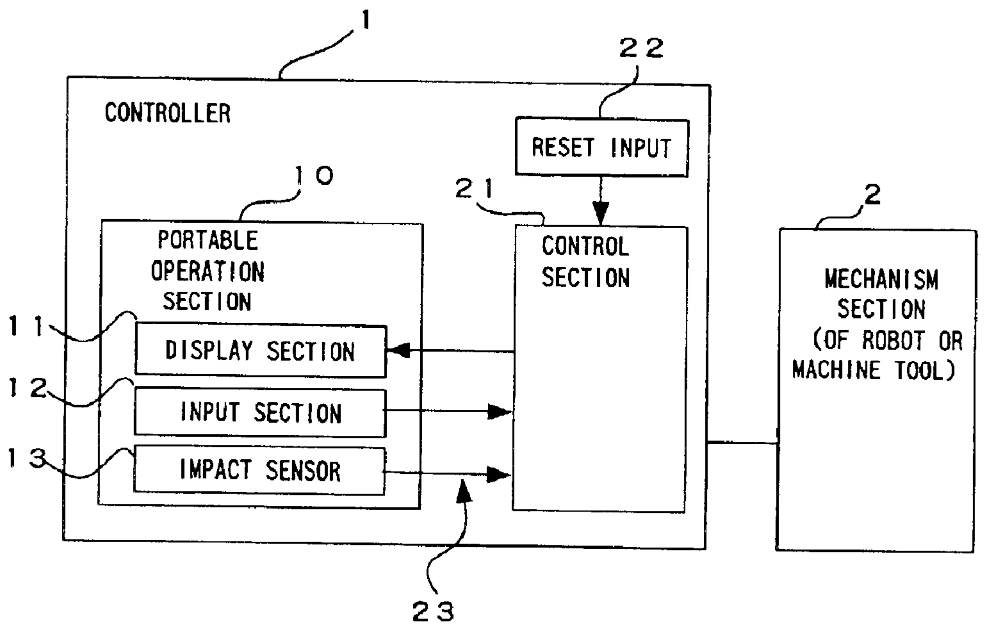
FIG. 1 illustrates main components of a first embodiment of the present invention.

FIG. 1 illustrates main components of a first embodiment of a controller according to the present invention. A mechanism section 2 of a robot or a machine tool is connected to a controller 1 through a communication line. The controller 1 includes a control section 21 and a portable operation section 10. The control section 21 controls the operation of the mechanism section 2 of the robot or the machine tool. The controller 1 further includes a reset input means 22 in relation to the present invention. The control section 21 is composed of a processor, a memory such as ROM and RAM, and an input/output interface or the like. Furthermore, the portable operation section 10 includes a display section 11 such as a liquid crystal display and an operation input section 12 such as a key and a switch and is connected with the control section 21 through a communication line 23. The display section 11 is used for the display or the like of various data, operation guide and a warning sent from the controller 21 and data of a value or the like inputted through the input section 12. The input section 12 is used for the input of various commands, setting values, operation program such as teaching programs or the like through the keys, the switches or the like included therein.

The portable operation section 10 includes the above-described display section 11 and the input section 12, as with the case of the conventional portable operation section. The present invention is characterized in that this portable operation section 10 further includes an impact sensor 13.

When the portable operation section 10 receives an impact which is higher than a predetermined permissible value, the impact sensor 13 of the portable operation section 10 sends an impact detection signal to the control section 21 through the communication line 23. This impact sensor 13 itself may be a conventionally-known one.

Figure 2:
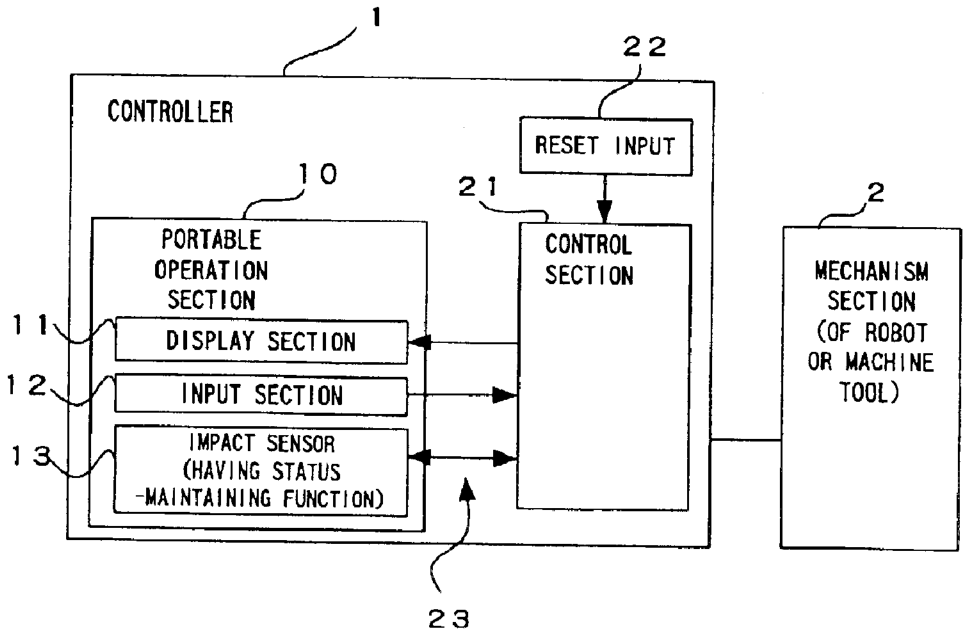
FIG. 2 illustrates main components of a second embodiment of the present invention.

FIG. 2 illustrates main components of a second embodiment of a controller according to the present invention. The second embodiment differs from the first embodiment in that an impact sensor 14 included in the portable operation section 10 has a status-maintaining function. This impact sensor 14 having the status-maintaining function also may be a conventionally-known one and has two types as shown in FIGS. 5 and 6.

Figure 5:
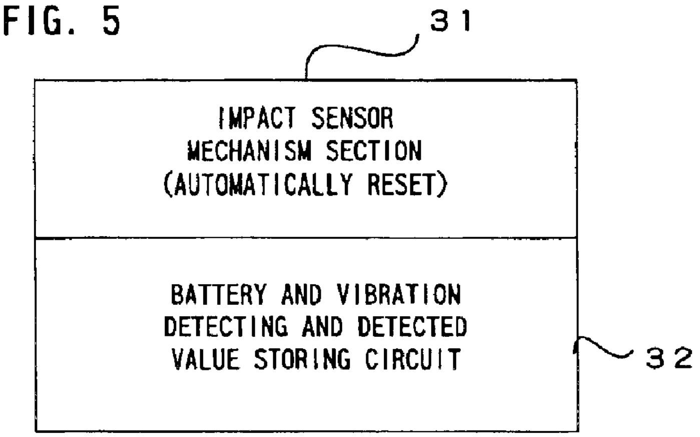
FIG. 5 illustrates the first type of an impact sensor having a status-maintaining function.

One type of the impact sensor 14 having the status-maintaining function shown in FIG. 5 is composed of an impact sensor mechanism section 31 which detects an impact to automatically reset, and a vibration detecting and detected value storing circuit 32, backed up by a battery, which converts the vibration mechanically detected by the impact sensor mechanism section 31 into an electric signal to detect the vibration and store the detected value.

When the impact sensor mechanism section 31 detects an impact, the vibration detecting and detected value storing circuit 32 converts the magnitude of the vibration caused by the impact into an electric signal and stores the signal. Then, when this detected value is equal to or higher than a predetermined permissible value, the vibration detecting and detected value storing circuit 32 outputs an impact detection signal to the control section 21. Detected values stored in this vibration detecting and detected value storing circuit 32 are reset by manual operation or a signal from the control section 21.

Figure 6:
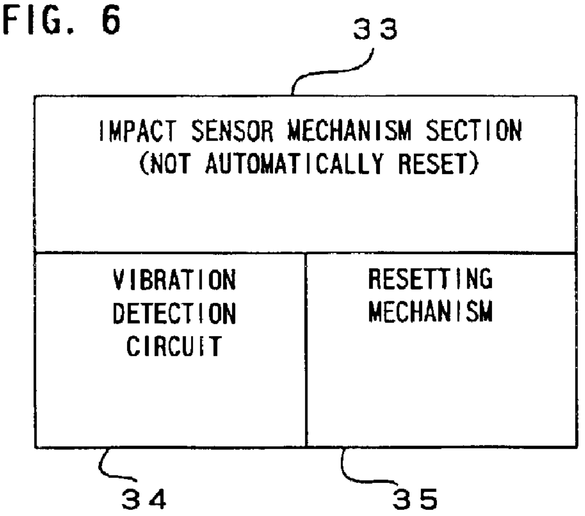
FIG. 6 illustrates the second type of an impact sensor having a status-maintaining function.

The other type of the impact sensor 14 having the status-maintaining function shown in FIG. 6 is an impact sensor which is composed of an impact sensor mechanism section 33 which does not automatically reset, a vibration detection circuit 34, and a reset mechanism 35. When the impact sensor mechanism section 33 receives an impact or vibration which is equal to or higher than a predetermined permissible value, the impact sensor mechanism section 33 keeps its detection status. The vibration detection circuit 34 converts the detection status of the impact sensor mechanism section 33 into an electric signal to output the electric signal to the control section 21. Then, the reset circuit 35 is activated by a manual operation or a signal from the control section 21 to allow the reset circuit 35 to reset the impact detection status of the sensor mechanism section 33.

Figure 3:
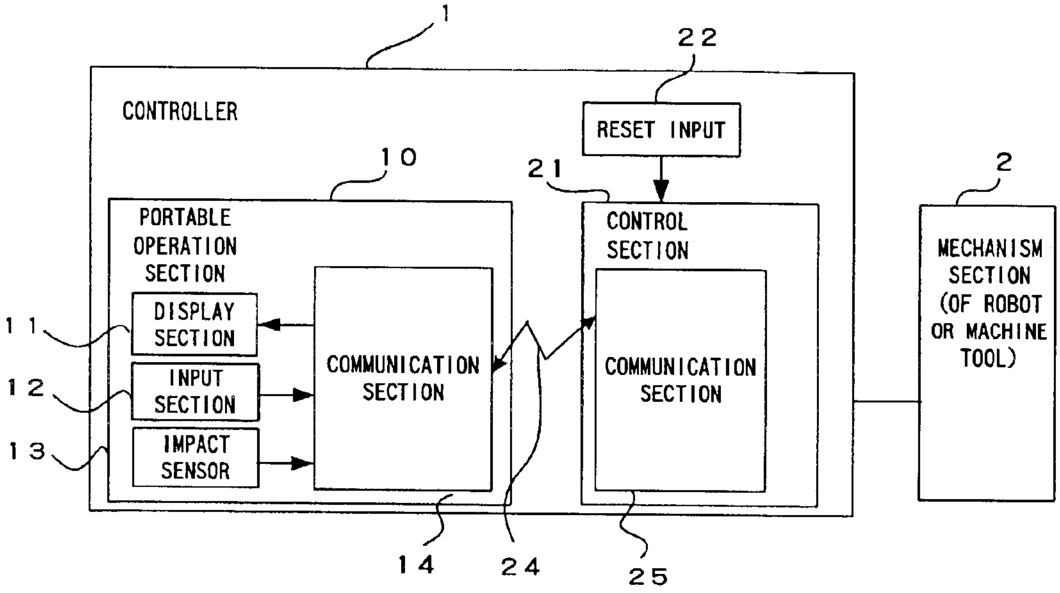
FIG. 3 illustrates main components of a third embodiment of the present invention.

FIG. 3 illustrates main components of a third embodiment of the controller according to the present invention. This third embodiment differs from the first embodiment shown in FIG. 1 only in that the control section 21 and the portable operation section 10 have a radio connection therebetween. Specifically, the portable operation section 10 and the control section 21 have communication sections 14 and 25, respectively, through which the portable operation section 10 and the control section 21 communicate through a radio link 24. Other configurations of the third embodiment are the same as those of the first embodiment shown in FIG. 1.

Figure 4:
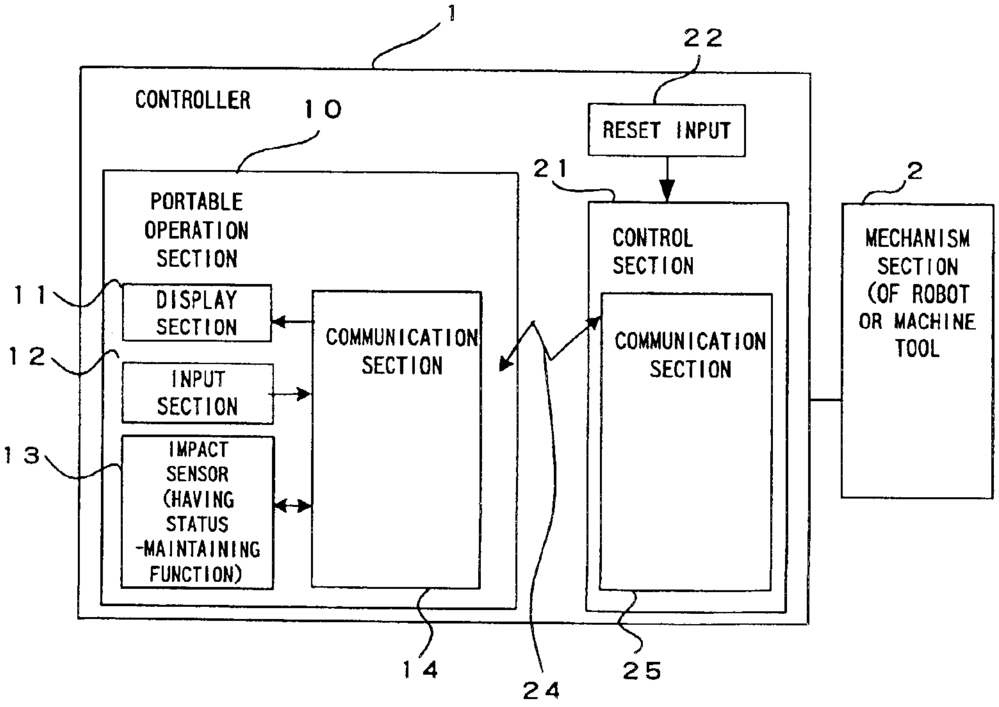
FIG. 4 illustrates main components of a fourth embodiment of the present invention.

FIG. 4 illustrates main components of a fourth embodiment of the controller according to the present invention. This fourth embodiment differs from the second embodiment shown in FIG. 2 only in that the portable operation section 10 and the control section 21 have the communication sections 14 and 25, respectively, through which the portable operation section 10 and the control section 21 communicate by means of the radio link 24.

Next, operation of each of these embodiments will be described. In the embodiments, the following four operation modes are used in which: (1) a first mode in which a machine such as the machine tool and an industrial robot controlled by this controller is stopped and disabled; (2) a second mode in which a signal from the portable operation section 10 is ignored; (3) a third mode in which a signal from the portable operation section 10 is ignored or the operation of the machine is stopped to allow the machine to be in an operation-disabled status while an automatic trouble diagnosis processing is performed; and (4) a fourth mode in which an interactive trouble diagnosis processing is performed.

Figure 7:
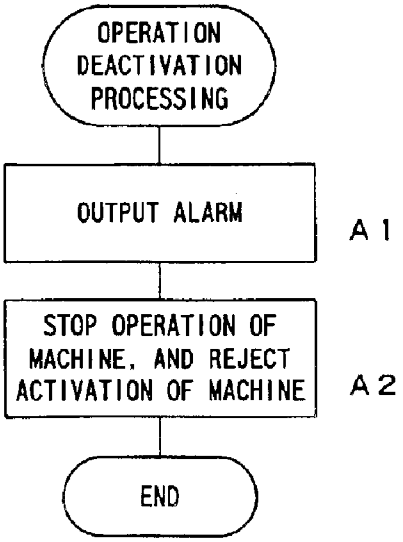
FIG. 7 illustrates a flowchart of a processing in which the mechanism section of a machine such as a robot and a machine tool is stopped and activation of the machine is disabled when an impact is detected in each embodiment.

In the case of the first mode in which a machine controlled by the controller 1 is stopped and disabled when an impact is detected, in each of the embodiments shown in FIGS. 1 to 4, the detection of an impact leads to the stoppage of the operation of the machine controlled by the controller 1 so that the machine is in a disabled status. In the first mode, the control section 21 performs a processing shown in FIG. 7 when receiving an impact detection signal from the impact sensors 13 or 14, outputs an alarm signal, inform of an occurrence of impact using an alert means such as a bell and a display lamp not shown (step A1), applies an emergency stop to the operation of the machine and set an impact detection flag. Thereafter, while the impact detection flag is set, the machine such as a robot and machine tool is kept in a disabled status such that the machine is unable to start even when an activation signal is inputted, unless reset signal is inputted from the reset input means 22 (step A2). As a result, the mechanism section 2 of the robot or the machine tool will never bring about a malfunction even when an internal circuit or the like of the portable operation section 10 has a trouble due to an impact to cause an inappropriate signal to be inputted to the control section 21.

Figure 8:
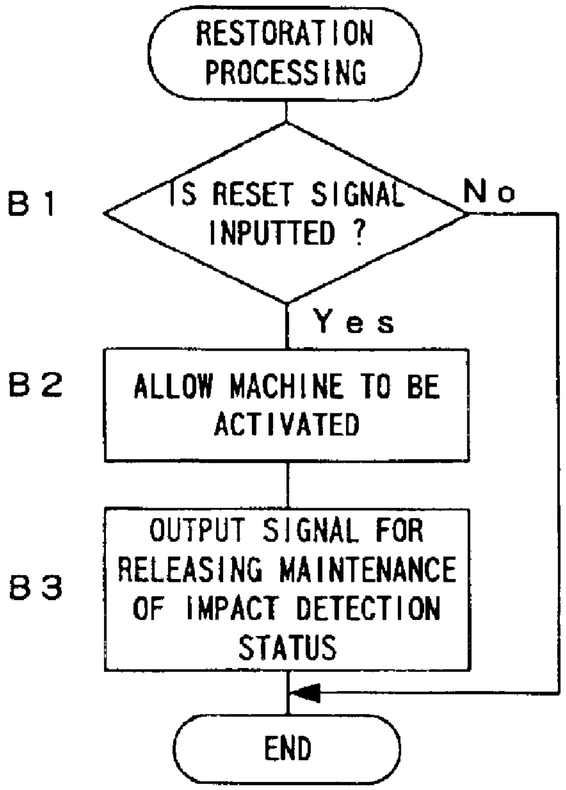
FIG. 8 illustrates a flowchart of a processing in which a disabled machine is restored from the disabled status.

While the operation of the machine is in a stopped status due to the detection of an impact, on the other hand, the processor of the control section 21 performs the processing shown in FIG. 8 with a predetermined cycle to determine whether or not a reset signal has been inputted from the reset input means 22 to the control section 21 (step B1). Upon receiving the reset signal, the control section 21 reset the impact detection flag to allow the machine to be activated (step B2).

Furthermore, when the impact sensor 14 having the status-maintaining function is used in embodiments shown in FIGS. 2 and 4, the control section 21 sends an impact detection maintenance releasing signal to the portable operation section 10 (step B3) to cancel the maintenance of the impact/vibration detection status of the impact sensor 14. It is noted that the process at this step B3 is not required in the case where the maintenance of the impact/vibration detection status is manually cancelled and in the case of the first and third embodiments shown in FIGS. 1 and 3.

Figure 9:
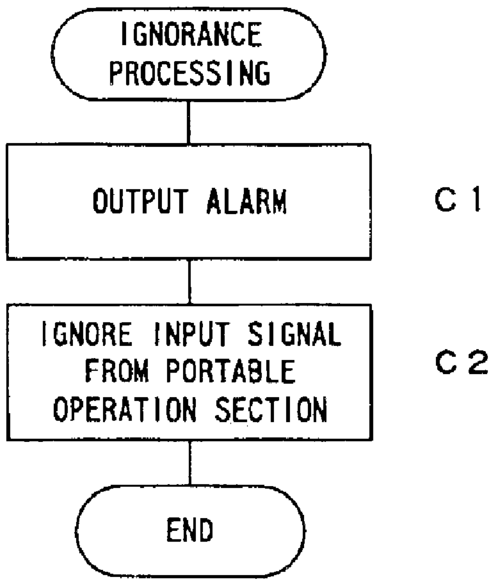
FIG. 9 illustrates a flowchart of a processing in which a signal from a portable operation section is ignored after detection of an impact in each embodiment.

In the case of the second mode in which the control section 21 ignores a signal from the portable operation section 10, in each of the embodiments shown in FIGS. 1 to 4, the control section 21 performs a processing shown in the flowchart in FIG. 9, in addition to the processing now under execution, when receiving an impact detection signal from the impact sensor 13 or 14.

First, the control section 21 outputs an alarm signal to inform of an occurrence of impact using an alert means such as a bell and a display lamp not shown (step C1) and sets an impact detection flag. Thereafter, while the impact detection flag is set, the control section 21 does not use the input signal for the control of the mechanism section 2 of the robot or the machine tool (step C2), ignoring an input signal from the portable operation section 10. As a result, the mechanism section 2 of the robot or the machine tool will never have a malfunction even when an internal circuit or the like of the portable operation section 10 has a trouble due to an impact to cause an inappropriate signal to be inputted to the control section 21. For example, even when a failure of the internal circuit due to an impact brings about a continuous generation of rapid feed command, or even when a rapid feed command is outputted from the portable operation section 10 to the control section 21, contrary to the content of the command inputted by an operator, the control section 21 disables such a command signal. As a result, the mechanism section 2 of the robot or the machine tool is prevented from performing a rapid feed operation by mistake, thereby securing the safety.

The control section 21 continues ignoring a signal from the portable operation sensor 10 until the control section 21 receives a reset signal from the reset input means 22. In this case, the processor in the control section 21 executes a processing shown in FIG. 12 with a predetermined cycle to determine whether a reset signal has been inputted or not (step F1). Upon receiving the reset signal, the control section 21 resets the impact detection flag to cancel the ignorance of the signal from the portable operation section 10 and enable the signal (step F2).

Furthermore, when the impact sensor 14 having the status-maintaining function is used in the embodiments shown in FIGS. 2 and 4, an impact detection maintenance releasing signal is sent from the control section 21 to the portable operation section 10 (step F3) in order to cancel the maintenance of the impact/vibration detection status of the impact sensor 14. It is noted that the process at this step F3 is not required in the case where the maintenance of the impact/vibration detection status is manually cancelled and in the case of the first and third embodiments shown in FIGS. 1 and 3.

Next, the third mode in the first to fourth embodiments in which the control section 21 ignores a signal from the portable operation section 10 while practicing an automatic trouble diagnosis processing will be described with reference to a flowchart of an automatic diagnosis processing shown in FIG. 10 which is performed by the processor of the control section 21.

Figure 10:
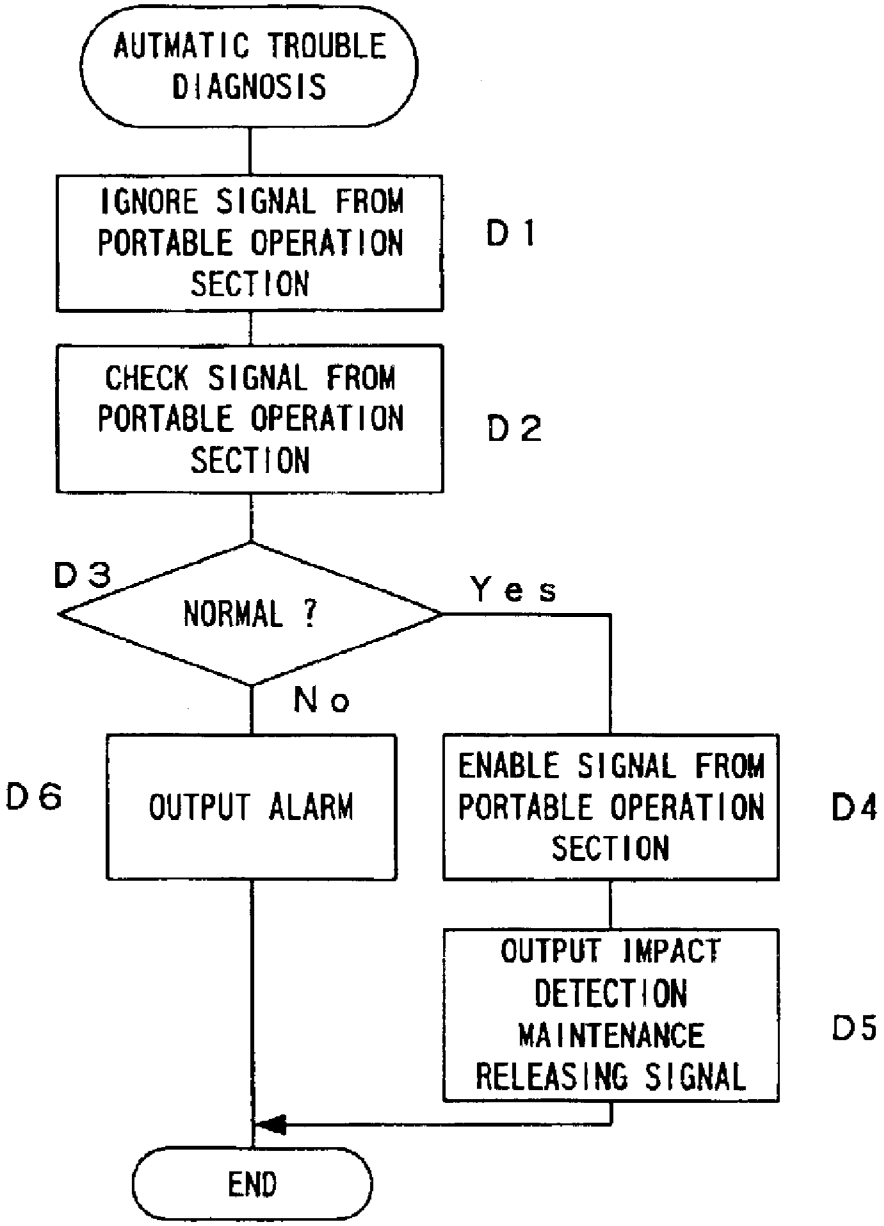
FIG. 10 illustrates a flowchart of a processing in which a signal from the portable operation section is ignored and an automatic trouble diagnosis is performed after detection of an impact in each embodiment.

When the control section 21 receives an impact detection signal, the processor of the control section 21 performs a processing shown in the flowchart shown in FIG. 10, in addition to the processing now under execution. First, the control section 21 sets an impact detection flag. While this impact detection flag is set, the control section 21 disables an input signal from the portable operation section 10 and thus does not use this input signal for the control of the mechanism section of the machine tool or the robot (step D1). Next, the control section 21 practices a conventional automatic diagnosis processing for determining whether the signal from the portable operation section 10 is a normal one or not. If determined that the signal is normal (steps D2 and D3), the control section 21 resets the impact detection flag to cancel the ignorance of the signal from the portable operation section 10 so as to enable the signal (step D4). Further, in the case where the impact sensor 14 having the status-maintaining function is used (i.e., in the case of the second and fourth embodiments shown in FIGS. 2 and 4), the impact detection maintenance releasing signal is sent from the control section 21 to the portable operation section 10 in order to cancel the maintenance of the impact/vibration detection status of the impact sensor 14 (step D5), thereby finishing this processing.

On the other hand, if the result of the automatic diagnosis processing practiced by the control section 21 shows that the signal is not a normal one (steps D2 and D3), the control section 21 outputs an alarm signal to indicate, by an alert means such as a bell and a display lamp not shown, that the portable operation section 10 has a trouble (step D6). It is noted that the first and third embodiments shown in FIGS. 1 and 3 do not use the impact detection function and thus the processing at step D5 is omitted in the first and third embodiments.

Figure 12:
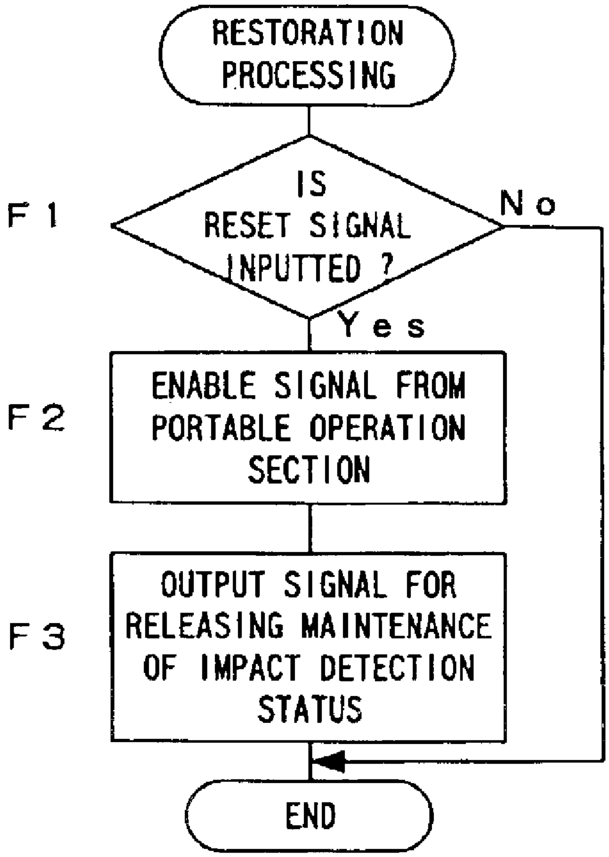
FIG. 12 illustrates a flowchart of a processing in which a signal from the portable operation section is ignored and then the ignorance of the signal is withdrawn.

Furthermore, after the control section 21 outputs an alarm in the processing at step D6 and ignores the signal from the portable operation section 10, the above-described processing shown in FIG. 12 is performed with a predetermined cycle. In consequence, upon receiving the reset signal from the reset input means 22, the control section 21 enables the signal from the portable operation section 10. This processing shown in FIG. 12 has already been described, so that the explanation is omitted here.

In the above-described third mode, the control section 21 ignores the signal from the portable operation section 10 while practicing the automatic trouble diagnosis processing. Alternatively, this mode may be modified such that operation of the mechanical section 2 is stopped when an impact is detected and then practices a trouble diagnosis processing. In this case, processing at step D1 in the flowchart of FIG. 10 is replaced with processing in which the operation of the mechanism section 2 is stopped and a flag for rejecting an activation of the mechanism section 2 is set to prevent the machine from being activated. Processing at step D4 is also replaced with processing in which a flag for rejecting the activation of the mechanism section 2 is reset to allow the machine to be activated. Other processing are same as the corresponding ones of the third mode. When an alarm signal is issued at step D6, the processor of the control section 21 performs processing of FIG. 8 with a predetermined cycle. Upon receiving the reset signal, the control section 21 performs the processing of FIG. 8 as described above, thereby allowing the mechanism section of a machine such as a robot and machine tool to operate.

In the third mode, the control section 21 practices the automatic trouble diagnosis, as described above. Next, the fourth mode will be described with reference to a processing flowchart shown in FIG. 11 in which the control section 21 ignores the signal from the portable operation section 10 while practicing the interactive trouble diagnosis processing.

Figure 11:
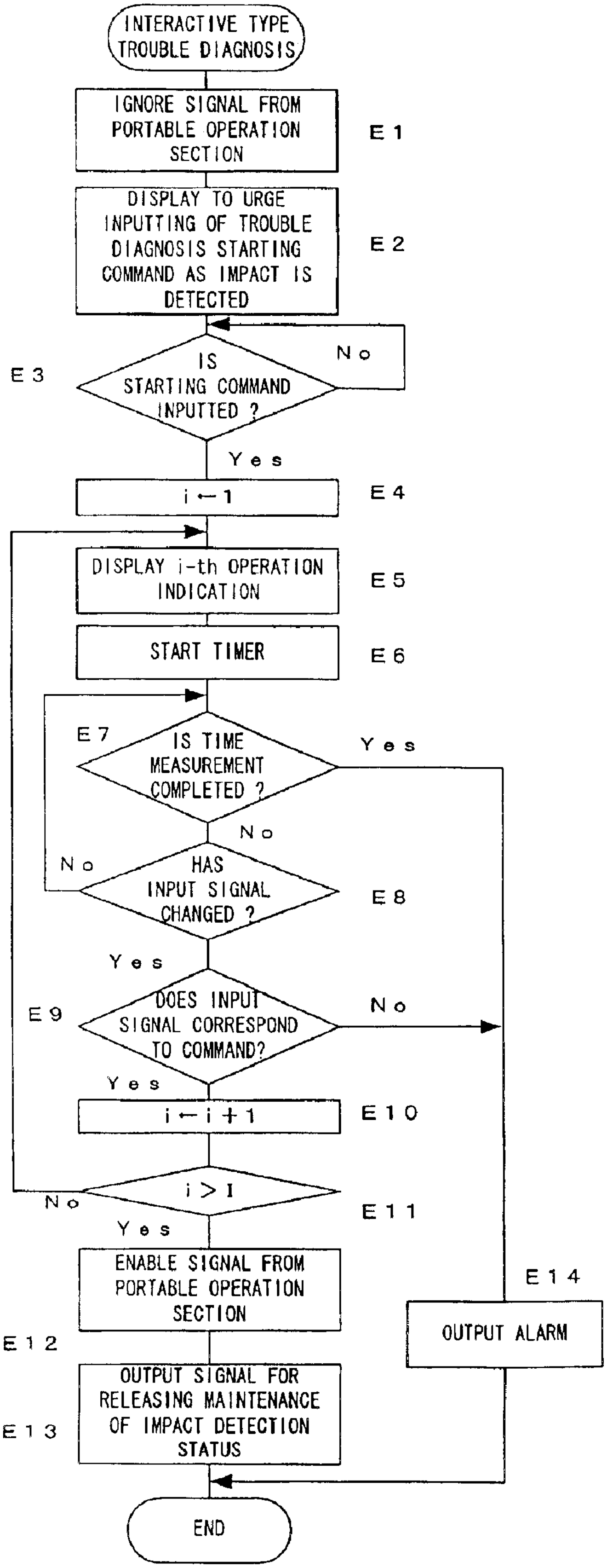
FIG. 11 illustrates a flowchart of a processing in which a signal from the portable operation section is ignored and an interactive trouble diagnosis is performed after detection of an impact in each embodiment.

In the first to fourth embodiments shown in FIGS. 1 to 4, when an impact detection signal is inputted from the portable operation section 10 to the control section 21, the processor of the control section 21 performs a processing of the flowchart shown in FIG. 11, in addition to the processing now under execution. First, the control section 21 sets an impact detection flag. While this flag is set, the control section 21 disables an input signal from the portable operation section 10 and thus does not use the input signal for the control of the mechanism section of the machine tool or the robot (step E1).

Then, the control section21 displays on the display section 11 of the portable operation section 10 that an impact has occurred and that a trouble diagnosis starting command for further processing should be inputted (step E2). If an impact causes the display section and/or the display driving control circuit or the like to have a trouble, an operator will be able to recognize the occurrence of the impact from the fact that no display is performed. If the control section 21 has a display means, this display means may display various indications for an interactive trouble diagnosis.

Then, the control section 21 waits for an input of the starting command (step E3). Upon receiving the starting command, the control section 21 sets an index i to "1" (step E4) so that i-th operational indication is displayed on the display section 11 or the display means of the control section 21, thereby resetting and starting a timer (steps E5 and E6). The processor of the control section 21 detects whether the timer has completed time measurement or not and whether an input signal from the portable operation section 10 has changed or not (steps E7 and E8). When the timer has completed measurement of a predetermined time while the input signal from the portable operation section 10 does not change, an alarm signal is issued to inform of occurrence of a trouble with alert means such as a bell and lamp not shown (step E14).

If the input signal from the portable operation section 10 shows a change before the timer completes time measurement, the control section 21 determines whether or not the input signal is the one based on the operation indicated at step E5 (step E9). If determined that the input signal is not the one based on the operation indicated at step E5, the procedure proceeds to step E14 to issue an alarm signal, assuming that a trouble has occurred and an inappropriate signal has been inputted.

On the other hand, if determined that the input signal is the one based on the operation indicated at step E5, the procedure proceeds from step E9 to step E10 to increment the index i by "1". Then, the control section 21 determines whether or not the index i exceeds the number "I" of the operational indication for the trouble diagnosis, stored in advance (step E11). If the index i does not exceed the number "I", the procedure to step E5 to allow the display section 11 or the display means of the control section 21 to display an operational indication represented by the index i. After that, the procedure at step E6 and following steps are repeatedly executed.

The procedure at step E5 to step E11 is repeatedly executed until the index i exceeds the number I of operational indication. During this repeated execution, if the timer completes time measurement while the input signal to the control section has not changed, though an operation input is conducted according to an indication (step E9), or if any signal not corresponding to operational indication is inputted (step E9), the procedure proceeds to step E14 to output an alarm signal, as described above.

When an operation input signal corresponding to an indication is inputted until the index i exceeds the number I of operational indication (i.e., until the result of step E11 results in "Yes"), on the other hand, the control section 21 resets the impact detection flag to enable the signal from the portable operation section 10. Thereafter, receiving an input signal for various instructions or the like from the portable operation section 10, the control section 21 performs a control in accordance with the input signal (step E12). Furthermore, when the impact sensor 14 having the status-maintaining function is used (i.e., in the case of the second and fourth embodiments shown in FIGS. 2 and 4), an impact detection maintenance releasing signal is sent to the portable operation section 10 to release the maintenance of the impact/vibration detection status of the impact sensor 14 (step E13), thereby completing this processing. It is noted here that the first and third embodiments shown in FIGS. 1 and 3 do not store a detected impact and thus omit the processing at step E13.

In the case of this fourth mode, too, an alarm signal is issued at step E14 to ignore the signal from the portable operation section 10. After that, the processor of the control section 21 performs the processing shown in FIG. 12 with a predetermined cycle. Upon receiving the reset signal, the control section 21 enables the signal from the portable operation section 10. In the case of the second and third embodiments, the control section 21 sends an impact detection maintenance releasing signal to the portable operation section 10.

In this fourth mode, too, in place of ignoring the signal from the portable operation section 10, the control section 21 may stop the operation of the mechanism section 2 of the robot, the machine tool or the like, which is controlled by this controller 1, to practice the interactive trouble diagnosis processing.

This case is different from the processing shown in the flowchart of FIG. 11 in that processing at step E1 is an operation deactivation processing in which the operation of the mechanism section 2 of a robot, machine tool or the like is stopped and the activation is prevented even when an activation command is inputted by setting a corresponding flag, in place of ignoring a signal from the portable operation section. The processing at step E12 is also changed such that the flag is reset to receive an activation signal for allowing the mechanism section 2 to operate. Further, when an alarm is issued at step E14, the processing shown in FIG. 8 is executed by the control section 21 with a predetermined cycle.

According to each mode of the above-described embodiments, an impact is detected by the impact sensor 14 and, when the impact detection signal is inputted to the control section 21, the control section 21 performs various processing for the detected impact. However, as one modification, the portable operation section 10 may comprise therein means for rejecting and stopping a signal outputted from the portable operation section 10 to the control section 21 so as to reject an impact detection signal if it is outputted from the impact sensor 14 and stop the input of the signal to the control section 21. In this case, it is preferable that the control section 21 also issues an alarm signal or displays an indication of detection of an impact at the portable operation section.

What is claimed is:

1. A controller comprising:

a control section and a portable operation section which is connected with said control section through a signal line or a radio communication path, wherein:

said portable operation section comprises a, sensor for detecting an impact applied to said portable operation section and outputting the detection signal to said control section, and said control section comprises:

means for disabling the operation of an object to be controlled by said controller when said control section is informed of the detection of an impact by said sensor.

2. The controller according to claim 1, wherein said control section further comprises means for automatically practicing a trouble diagnosis on said portable operation section when said control section is informed of the detection of an impact by said sensor.

3. The controller according to claim 1, wherein said control section further comprises:

means for causing a display means to display the content of an operation for a trouble diagnosis on said portable operation section when informed of the detection of an impact by said sensor; and trouble determination means for determining whether an input signal corresponding to the operation content displayed is normally inputted and determining that a trouble has occurred when detected that no signal is inputted normally.

4. The controller according claim 1, wherein said sensor detects an impact which is higher than the lowest level of an impact strength which has been set in advance.

5. The controller according to claim 1, wherein said sensor comprises an impact detection storage means for storing the detected impact and outputs, as an impact detection, a status in which the detected impact is being stored.

6. The controller according to claim 1, wherein:

said controller further comprises a reset input means for inputting a reset signal to said control section; and said control section comprises means for releasing a disabled status of the operation of an object to be controlled by said controller.

7. The controller according to claim 1, wherein said controller further comprises means for outputting to said sensor a signal for release of the impact detection stored in said impact detection storage means when a reset signal is inputted from said reset input means.

8. A controller comprising;

a control section and a portable operation section which is connected with said control section through a signal line or a radio communication path, wherein:

said portable operation section comprises a sensor for detecting an impact applied to the portable operation section and outputting the detection signal to said control section, and said control section comprises means for ignoring a signal from said portable operation section when said control section is informed of the detection of an impact by said sensor.

9. The controller according to claim 4, wherein:

said controller comprises reset input means for inputting a reset signal to said control section; and said control section comprises means for canceling an ignorance of the signal from said portable operation section when a reset signal is inputted from said reset input means.

10. A controller composing:

a control section and a portable operation section which is connected with said control section through a signal line or a radio communication path, wherein:

said portable operation section comprises a sensor for detecting an impact applied to said portable operation section and outputting the detection signal to said control section, and said control section comprises:

means for automatically practicing a trouble diagnosis on said portable operation section when informed of the detection of an impact by said sensor, and means for ignoring a signal from said portable operation section during the practicing of a trouble diagnosis with said trouble diagnosis means and after the detection of a trouble with the trouble diagnosis.

11. A controller comprising:

a control section and a portable operation section which is connected with said control section through a signal line or a radio communication path, wherein:

said portable operation section comprises a sensor for detecting an impact applied to said portable operation section and outputting the detection signal to said control section; and said control section comprises:

means for causing a display means to display the content of an operation for a trouble diagnosis on said portable operation section when informed of the detection of an impact by said sensor, trouble determination means for determining whether an input signal corresponding to the operation content displayed is normally inputted and determining that a trouble has occurred when detected that no signal is inputted normally, and means for ignoring a signal from said portable operation section during the practicing of a trouble diagnosis and after the detection of a trouble with the trouble diagnosis.

12. A controller comprising:

a control section and a portable operation section which is connected with said control section through a signal line or a radio communication path, wherein:

said portable operation section comprises:

a sensor for detecting an impact applied to said portable operation section and outputting the detection signal to said control section, and means for stopping the delivery of a signal to said control section when an impact is detected with said sensor.

* * * * *

UNITED STATES PATENT AND TRADEMARK OFFICE

CERTIFICATE OF CORRECTION

PATENT NO. : 6,917,837 B2
DATED : July 12, 2005
INVENTOR(S) : Yoshiki Hashimoto et al.

It is certified that error appears in the above-identified patent and that said Letters Patent is hereby corrected as shown below:

Drawings,
FIG. 4, Box 2, Line 5, after “TOOL” insert -- ) --.
FIG. 10, Box 1, Line 1, change “AUTMATIC” to -- AUTOMATIC --.

Column 10,
Line 64, change “comprising;” to -- comprising: --.

Column 11,
Line 10, change “claim 4” to -- claim 8 --.
Line 19, change “composing:” to -- comprising: --.

Signed and Sealed this

Twenty-eighth Day of March, 2006

JON W. DUDAS
*Director of the United States Patent and Trademark Office*